(No Model.)
C. S. FIFIELD.
FRICTION CLUTCH.
No. 496,603. Patented May 2, 1893.
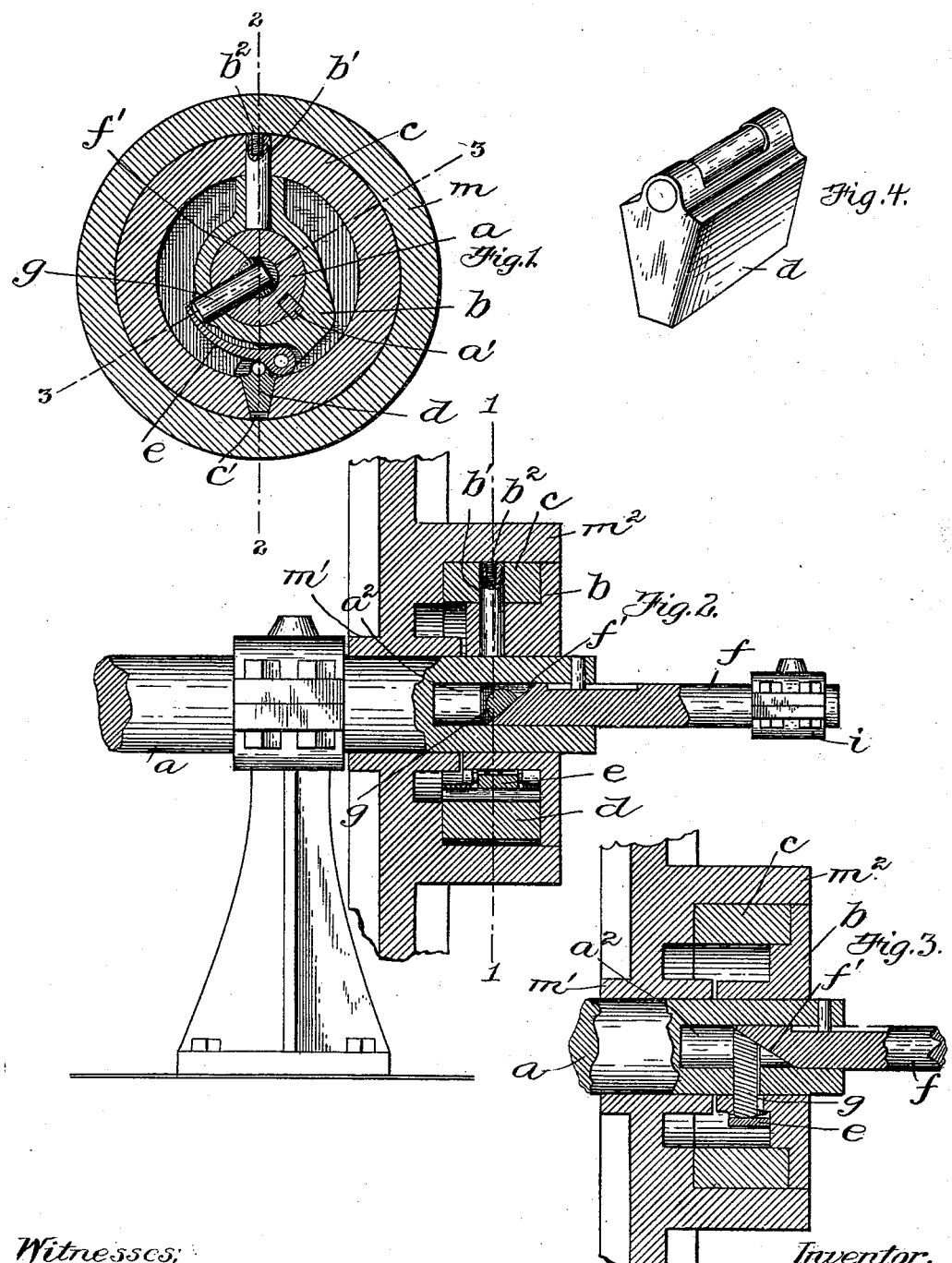
Witnesses:
Jmather Alley
John R. Snow.
Inventor,
Charles Stevens Fifield
By J. E. Maynadier
his Attorney.

UNITED STATES PATENT OFFICE.

CHARLES STEVEANS FIFIELD, OF REVERE, MASSACHUSETTS.

FRICTION-CLUTCH.

SPECIFICATION forming part of Letters Patent No. 496,603, dated May 2, 1893.

Application filed December 5, 1892. Serial No. 454,052. (No model.)

*To all whom it may concern:*

Be it known that I, CHARLES STEVEANS FIFIELD, of Revere, in the county of Suffolk and State of Massachusetts, have invented a new and useful Improvement in Friction-Clutches, of which the following is a specification.

My invention is an improvement in that class of friction clutches in which an expansion ring is expanded by a wedge moved by a lever, and consists in a new construction which is compact, and in which none of the parts are subjected to great wear.

In the drawings: Figure 1 is a section of my improved clutch on line 1—1 of Fig. 2. Fig. 2 is a section on line 2—2 of Fig. 1, Fig. 3 another section on line 3—3 of Fig. 1, and Fig. 4 a detail in perspective of the wedge.

My improved clutch consists essentially of a collar $b$, fast to shaft $a$, as by spline $a'$; expansion ring $c$, secured to collar $b$, as by pin $b'$, which is shown with a screw thread $b^2$ tapped in it, by which construction the ring may be readily removed on occasion; shaft $f$ movable endwise in and splined to shaft $a$, and with an inclined surface $f'$ on its inner end; pin $g$ passing through shaft $a$ and the hub of collar $b$, and also inclined on its inner end; lever $e$; and wedge $d$. Shaft $a$ is bored out at $a^2$ to receive shaft $f$ which is secured in shaft $a$ so as to rotate therewith but be free to move endwise. An inclined surface $f'$ is formed on the inner end of shaft $f$ and an inclined surface also on the inner end of pin $g$, which is moved endwise in a hole formed through the hub of collar $b$ and through the shaft $a$. The outer end of pin $g$ is preferably rounded to provide a better bearing surface on lever $e$. Shaft $f$ is actuated by block $i$ which is of usual construction, and is connected in the usual way to a treadle, or the like by which it is moved to force shaft $f$ endwise. Hub $m'$ of pulley $m$ revolves upon shaft $a$, when ring $c$ is not expanded in the flange $m^2$ of the pulley.

The operation of my clutch will now be readily understood. When it is desired to make pulley $m$ fast to shaft $a$, shaft $f$ is moved inward and inclined surface $f'$ acts upon pin $g$ forcing lever $e$ outwardly and wedge $d$ between the ends of ring $c$ thus expanding the ring in the flange $m^2$. To unclutch, shaft $f$ is moved outwardly, and the spring of ring $c$ is sufficient to cause wedge $d$ to move back, carrying with it lever $e$; but of course a retracting spring may be used if desired.

I am aware of English patents No. 15,314, of 1888, and No. 14,453, of 1884, and of United States Patent No. 339,310, dated April 6, 1886, and disclaim all that is shown in them. While all these patents show friction clutches of this class, yet they all lack sundry elements of my new combination; that is while the general principles of all friction clutches of this class are, of course, the same, yet my clutch has important advantages of construction over any other known to me, for the inclined surfaces of shaft $f$ and pin $g$ move pin $g$ outward with much force; pin $g$ is securely held as it is surrounded by portions of shaft $a$ and the hub of collar $b$; lever $e$ is boxed in by the collar $b$, and wedge $d$ securely held in place by lever $e$, and is boxed in by ring $c$ and collar $b$; moreover each and all of the bearings are almost wholly unaffected by wear; while abundant power is imparted through shaft $f$, pin $g$ and lever $e$, so that ring $c$ can be made very stout.

What I claim is—

In combination shaft $a$; collar $b$ fast to it; expansion ring $c$, fast to collar $b$; shaft $f$ movable endwise in shaft $a$, with inclined surface on its inner end; lever $e$; wedge $d$, and flanged pulley, $m$, $m^2$; all combined and operating substantially as described.

CHARLES STEVEANS FIFIELD.

Witnesses:
JONATHAN CILLEY,
JOHN R. SNOW.